Nov. 7, 1944.  N. R. SCHWARTZ  2,362,100
UNIVERSALLY ADJUSTABLE SWIVEL UNIT
Filed Jan. 23, 1943
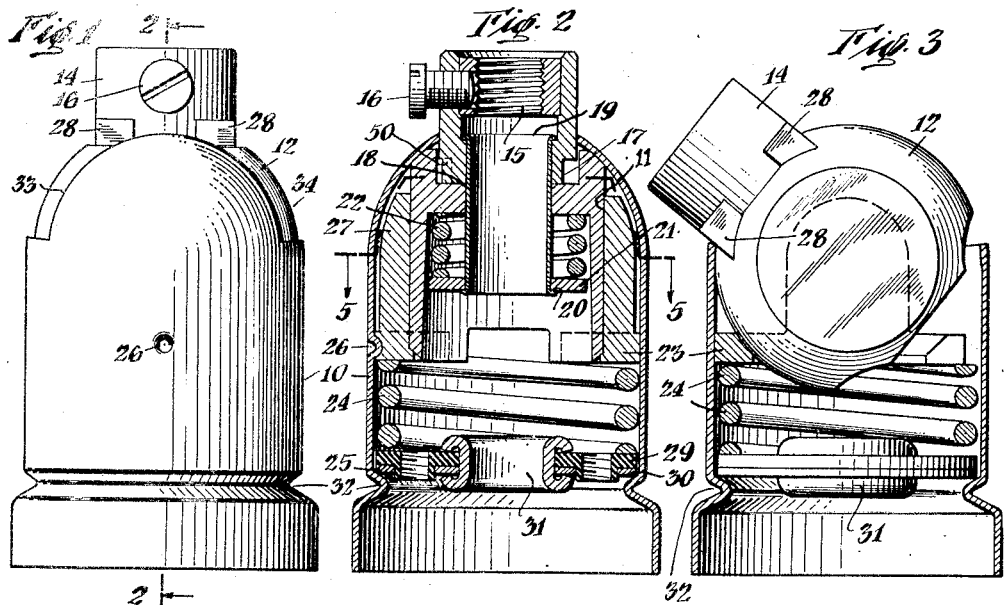
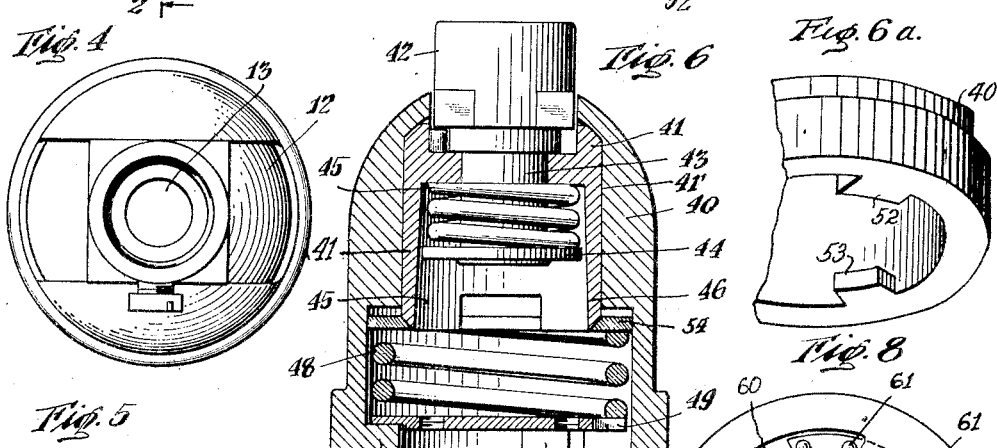
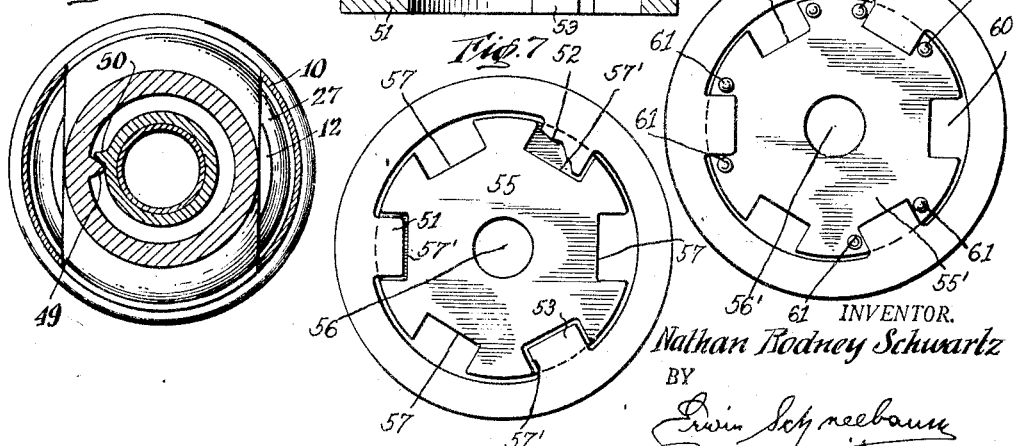
INVENTOR.
Nathan Rodney Schwartz
BY
Erwin Schneebaum
ATTORNEY Patented Nov. 7, 1944

2,362,100

UNITED STATES PATENT OFFICE 2,362,100

UNIVERSALLY ADJUSTABLE SWIVEL UNIT

Nathan Rodney Schwartz, New York, N. Y.

Application January 23, 1943, Serial No. 473,417

6 Claims. (Cl. 287—23)

This invention refers to swivel units and more particularly to swivel units which may be attached to electric light fixtures, such as ceiling lamps, wall lamps, floor lamps, desk lamps, industrial lamps and other such fixtures of the incandescent or fluorescent type, as well as to electrical sockets, the said swivel unit being universally adjustable, so that an object attached thereto may be turned axially to 90 degrees of its normal axis, and rotatable substantially one complete revocation, and which is so constructed that it will be automatically retained in any of its adjusted positions.

This application has reference to an application filed by the same inventor on December 26, 1940, Serial No. 371,691.

It is the principal object of the present invention to provide a swivel unit, comprising a housing in which a spring-pressed swivel member is retained, and to provide the housing with means to permit the swivel member to be turned axially to 90 degrees of its normal axis and therebeyond.

A further object resides in the provision of means for preventing the rotative movement of the said swivel member beyond substantially one complete revolution.

Still another advantage of this invention resides in the provision of means throughout the entire circumference of the housing for retaining the member contained in the housing in its proper position.

Yet another purpose of this invention is to provide a washer upon which a tension spring is seated the function of which is to urge the swivel member upwardly in the housing, the washer being provided with means to prevent it from warping and thus from becoming disengaged from its retaining means, and to render the washer strong and durable.

It is a further object of this invention to provide a retaining member upon which the swivel member is seated, the retaining member being provided with means to prevent the swivel member from turning in the housing.

And it is yet another purpose of this invention to provide a swivel unit of this character having a solid housing, the swivel member being contained in a space in the housing provided for that purpose, and a locking washer to retain the swivel unit in position.

These and other meritorious objects and advantages, which will become more fully apparent as the description hereof proceeds, are accomplished by the novel construction, combination and arrangement of parts, hereinafter described and illustrated in the accompanying drawing, forming a material component of this disclosure, and in which:

Figure 1 is a front elevational view of a swivel unit constructed in accordance with the present invention.

Figure 2 is a cross-sectional view of the swivel unit, showing its interior construction.

Figure 3 is a partial sectional, partial front elevational view of the device, showing the swivel member turned substantially 45 degrees of its normal axis.

Figure 4 is a top plan view of the device.

Figure 5 is a sectional view, the section taken on line 5—5 of Figure 2.

Figure 6 is a sectional view of a modification of the swivel unit referred to herein.

Figure 6a is a fragmentary perspective view of Figure 6, looking up.

Figure 7 is a top plan view of a locking washer used in connection with the modified form of this invention, the washer being shown in locked position.

Figure 8 is a modified locking washer used in connection with the modified form of this invention.

Referring in greater detail to the drawing, the numeral 10 designates in general a thin-walled metallic housing, having a cylindrical outer surface which merges at one end into a rounded upper portion.

Enclosed within the rounded upper portion of said housing 10 is a ball 12 having flat sides 11. Said ball 12 is provided at its center with a bore 13 extending vertically therethrough, in which is adapted to be entered a conductor comprising in part an upper portion 14 having frictionally retained in its upper portion an inwardly threaded screw socket 15 the purpose of which will be presently described. The upper portion of said conductor 14 extends upwardly beyond housing 10. Near their upper ends, conductor 14 and screw socket 15 are provided with an opening through which may be entered set screw 16 or any other suitable securing means which aids in retaining screw socket 15 in engagement in the upper portion of conductor 14.

The upper portion of said conductor 14 is reduced at its lower end, as is indicated at 17. The said conductor also comprises a hollow cylindrical sleeve member 18 having a shoulder 19 at its upper end which sets on the reduced portion 17 of the upper portion of the conductor. Sleeve 18 terminates in a flared portion 20 which forms a seat for washer 21 upon which rests a coiled compression spring 22 to tensionally engage said conductor in said ball.

Ball 12 seats on a retainer ring 23 which is urged upwardly against said ball by a coiled tension spring 24 resting on washer 25. In order to prevent an inadvertent dislocation of the retainer ring 23 and ball 12 resting thereupon, housing 10 may be impinged inwardly at the point where retainer ring is located when assembled, as is indicated at 26.

In order to prevent ball 12 from rotating in housing 10, retainer ring 23 has formed integrally therewith a plurality of upwardly reaching extensions 27 which, when the device is assembled, will be in close proximity to and parallel with two or more of the flat sides of ball 12. As a further means of preventing ball 12 from being turned in housing 10, ball 12 is provided with a plurality of lugs 28, the precise function of which will presently be described.

Washer 25 upon which rests compression spring 24 comprises two relatively thin discs, the upper one 29 made of an insulating material, such as fibre or any other suitable material, and the lower disc 30 made of a strengthening material such as steel or any other desirable material. Both discs have a central opening, and they are held in engagement by a joining ring 31 which encompasses the two discs circumferentially at the central opening, as is indicated in Figure 2 of the drawing.

At its upper end, housing 10 is provided with slots 33 and 34, at opposite sides of said housing, reaching from the apex of the housing to points therebelow, the slots 33 and 34 being of a width to permit the upper portion of conductor 14 to be entered therein.

At 17, where member 14 terminates in a reduced portion, the said member 14 is provided with a projection 50, and at that point, ball 12 is provided with a corresponding inreaching projection 49, for a purpose which will presently be clarified.

The modified form of the present invention, illustrated in Figures 6 and 7 of the drawing comprises a housing 40 cast from iron, steel, copper, brass or any other suitable and desirable substance and is identical in its outer contour to the housing illustrated in Figure 1.

Vertically through its center, housing 40 is provided with an opening to accommodate a spherical ball 41 having flat sides 41' and a central vertical bore throughout its length. A conductor is entered in the bore in ball 41, comprising an upper member 42, which extends upwardly beyond housing 40 and a constricted lower or sleeve portion 43 which terminates in a flare 44 upon which seats a circular tension spring 45 to tensionally retain said conductor in frictional engagement in said ball 41. The lower end portion of member 42 and the upper end portion of sleeve 43 are joined in a manner identical with what has been described in connection with the principal form of the invention and illustrated in Figure 2, and a repetition therefor seems unnecessary.

Near its base, housing 40 is provided with three inreaching lugs 51, 52 and 53. A circular tension spring 48 is provided, to normally urge ball 41 upwardly in housing 40, said ball 41 resting on a washer or retainer ring 54, which is engaged by the upper end of spring 48. Spring 48 seats on a circular washer 55, said washer having a circular opening 56 in its center. Washer 55 is provided along its outer edge with a plurality of spaced-apart cut-outs 57, the cut-outs being slightly wider than the width of lugs 51, 52, and 53 so that, when the device is assembled, the cut-outs will clear the lugs. Recesses 57' are formed in the edge of and on one face of the washer 55 at points between the cut-outs 57, in which lugs 51, 52 and 53 may be removably engaged to lock the contents of housing 40 against undesired disengagement.

The locking means illustrated in Figure 8 is a modification of the one shown in Figure 7. The modification resides in washer 55' which is provided with a plurality of spaced-apart cut-outs 60 along its outer edge, the cut-outs being slightly wider than the width of lugs 51, 52 and 53. On each side of three of these cut-outs is provided a superimposed boss 61. A central opening 56' is provided in washer 55' for the passage of electric wires therethrough.

The device operates in the following manner. When it is desired to use the swivel unit illustrated in Figure 1, a lamp or other electrical fixture or apparatus, having two conventional electric wires extending therefrom and provided with a conventional nipple, has its nipple entered into the screw socket 15 and is there retained in an obvious manner. The electric wires are drawn through the central opening in the conductor, retainer ring, spring and washer and attached to a conventional switch (not shown).

When the device illustrated in Figure 6 is to be employed, an electrical fixture is secured thereto in the manner just described. Thereafter the device may be locked by using either of the two washers illustrated. If the washer illustrated in Figure 7 is used, it is entered into the housing from the bottom in such way that the cut-outs will clear the lugs, whereby spring 48 is pressed upwardly. The washer is then turned slightly until the three lugs in the housing enter the recesses in three of the cut-outs provided for that purpose. Pressure upon the spring is then released and the action of the spring upon the washer will hold it in its proper place. Conversely, when it is desired to disengage the washer, it is pressed upwardly and turned, and can thus be disengaged. The washer illustrated in Figure 8 is used in a similar manner except that instead of recesses, bosses are provided, one on each side of the three cut-outs in which the lugs are intended to be entered. When pressure upon the spring is released, bosses 61 will be positioned one on each side of the three lugs, which will hold the washer in its adjusted position.

A lighting fixture or other electrical appliance may be rotated substantially one complete turn, but cannot be turned further in one direction due to the action of the stopping arrangement hereabove described. Continued turning in any one direction is avoided since it is undesirable, causing the cable to become twisted and eventually to break. When it is desired to turn the device angularly, the upper part of the conductor is entered in one of the slots in the housing, and an angularity up to 90 degrees in either direction can be achieved.

Clearly many modifications present themselves, and others will become apparent through use. For instance, instead of having two slots for the entrance of the upper part of the conductor, applicant may elect to have only one, or he may have more than two; applicant may elect to extend the slots further down, so as to achieve a greater angularity, or he may have a plurality of slots, each one extending downwardly to different points.

There has here been presented a highly effective swivel unit in its preferred embodiment and in modifications. This disclosure however is to be regarded as illustrative and description of the best known embodiments only, and not as restrictive or limitative to the exact details shown, applicant reserving the right to make such changes and modifications in his invention as come within the scope of the appended claims, without thereby departing from the spirit of the invention.

Having thus described the invention, what is claimed as new and desired to secure by Letters Patent is:

1. A swivel unit for attachment to a support having electric wires extending therefrom comprising a housing, a spherical member therein, a hollow conductor in said spherical member extending upwardly beyond said housing, a washer, said conductor terminating in means at one end retaining said washer and terminating in means at the other end engaging endwise against said spherical member, a compression spring on said washer cooperating with said spherical member tensionally retaining said conductor in frictional engagement in said spherical member, means formed at the lower end of said conductor to retain said spring in operative position, means in the upper end of said conductor for attachment of said swivel unit to a support, a compression spring to urge said swivel member upwardly in said housing, a washer on which said spring rests, means formed with said housing and washer to retain said washer in said housing, slots in said housing, said conductor adapted to be entered therein, said conductor adapted to be turned rotatively on its axis, means cooperating between said conductor and said spherical member to limit the rotative movement of said conductor, and a central vertical bore in said conductor and spring for the passage of electric wires therethrough.

2. In a swivel unit for attachment to a support having electric wires extending therefrom, a thin-walled housing having a cylindrical outer surface merging at one end into a rounded surface of a spherical nature, a spherical swivel member having substantially flat sides completely enclosed in said rounded surface, a conductor in said swivel member, said conductor comprising a hollow upper member extending beyond said housing and a hollow sleeve member, means formed with said upper member engaging said sleeve member in said upper member, a washer, said conductor terminating in means at one end retaining said washer and terminating in said upper member at the other end engaging endwise against said swivel member, a spring on said washer cooperating with said swivel member tensionally retaining said conductor in frictional engagement in said swivel member, a retainer ring on which said swivel member is seated, means integral with said retainer ring and cooperating with the flat sides of said swivel member preventing said swivel member from rotating in said housing, a spring in said housing urging said retainer ring upwardly against said swivel member, said spring resting on a washer, said washer comprising an insulated disc and a backing disc, means joining said discs, said housing knurled near the base thereof to retain said washer in engagement in said housing, slots in said housing extending from its top to points therebelow on opposite sides thereof, in which said upper part of said conductor may be entered, said conductor rotatively mounted in said swivel member, means cooperating between said swivel member and said conductor limiting the rotative movement of said conductor, said means comprising an extension on said conductor and a corresponding extension on said swivel member, and a passageway through said conductor, retainer-ring, spring and washer for the passage of electric wires therethrough.

3. A swivel unit for attachment to a support having electric wires extending therefrom comprising a thin-walled housing having a cylindrical outer surface merging at one end into a rounded surface of a spherical nature, a swivel member in said housing, said swivel member having a central vertical bore and substantially flat sides, a conductor in said swivel member, said conductor having a central vertical bore, said conductor comprising an upper member and a sleeve member, said upper member having a reduced portion near its lower end, said sleeve member having a shoulder at its upper end to seat on said reduced portion, said conductor terminating in a flare at one end and terminating in said upper member at the other end engaging endwise against said swivel member, a washer, said washer seating on said flare, a spring on said washer cooperating with said swivel member tensionally retaining said conductor in frictional engagement in said swivel member, a retainer ring on which said swivel member is seated, upreaching extensions integral with said retainer ring and parallel with the flat sides of said swivel member, a spring urging said retainer ring upward, a central vertical opening through said retainer ring and said spring, a washer on which said spring is seated, inreaching means formed with said housing retaining said washer in engagement in said housing, said washer comprising an insulation disc and a strengthening disc, means joining the said discs, a central vertical bore through said discs, said housing having slots in opposite sides thereof, said slots extending from the top to points therebelow in which the upper portion of said conductor may be entered, said conductor rotatively mounted in said swivel member, and means cooperating between said conductor and said swivel member limiting the rotative movement of said conductor at slightly less than one complete revolution, said openings in said conductor, ring, spring and washer forming a passageway for electric wires.

4. In a swivel unit for attachment to a support having electric wires extending therefrom, a solid cylindrical housing having a rounded upper portion, a vertical opening through its center, a spherical swivel member in said opening, a retainer ring on which said swivel member rests, said swivel member having a central vertical bore, a conductor in said bore extending upwardly above said housing, said conductor rotatably mounted in said swivel member, spring pressed means retaining said conductor in frictional engagement in said swivel member, means urging said swivel member upwardly in said housing, a washer upon which said urging means seat, a plurality of slots in said washer, a plurality of inreaching lugs near the base of said housing, recesses formed in said washer near said slots, said lugs adapted to rest therein releasingly locking said housing, a vertical passageway through said conductor, urging means and washer for the passage of electric wires therethrough, and slots in said housing at opposite sides thereof extending from the rounded upper portion to points therebelow in which the upper part of said conductor may be entered for angular adjustment of said conductor up to 90 degrees of its normal axis in either direction.

5. In a swivel unit for attachment to a support, a thick-walled cylindrical housing having a rounded upper portion, a vertical opening through said housing, a ball in said opening, said ball having substantially flat sides, said ball having a central vertical bore, a conductor in said bore extending upwardly beyond said housing, said conductor rotatably mounted in said ball, said conductor terminating in a flare at one end and terminating in means at the other end engaging endwise against said ball, a washer on said flare, a spring thereon cooperating with said ball tensionally retaining said conductor in frictional engagement in said ball, a washer on which said ball rests, a coiled compression spring urging said ball upwardly in said housing, a washer upon which said compression spring rests, said washer having a plurality of cut-outs at intervals along its circumference, downreaching projections on said washer, a plurality of inreaching lugs near the base of said housing, said cut-outs being slightly wider than the width of said lugs, said downreaching projections arranged in pairs, the distance between each of the two projections comprising each pair being slightly in excess of the width of each of said lugs, said lugs and projections forming a locking means for said washer.

6. A swivel unit for attachment to a support having electric wires extending therefrom comprising a thin-walled housing having a cylindrical outer surface which merges at one end into a rounded upper portion, a spherical swivel member in said rounded upper portion, said swivel member having two flat sides, a hollow conductor in said swivel member, said conductor terminating in a flare at one end and terminating in means at the other end engaging endwise against said swivel member, a washer on said flare, a spring thereon cooperating with said swivel member tensionally retaining said conductor in frictional engagement in said swivel member, a spring in said housing urging said swivel member upwardly, a washer on which said spring seats, means formed in said housing retaining said washer in operative position, the upper part of said conductor extending upwardly beyond said housing, slots in said housing on opposite sides thereof extending from the upper portion to points therebelow receiving said conductor, means cooperating between said conductor and said swivel member limiting the rotative movement of said conductor, means integral with said last named washer preventing said swivel member from rotating in said housing, a screw socket in frictional engagement in the upper part of said conductor for attachment of said swivel unit to a support, and a vertical opening through said conductor, spring and washer for the passage of electric wires therethrough.

NATHAN RODNEY SCHWARTZ.